US012639415B2

(12) United States Patent
Ramaiah et al.

(10) Patent No.: US 12,639,415 B2
(45) Date of Patent: May 26, 2026

(54) MANAGEMENT OF EDGE COMPUTING NETWORK DEPLOYMENTS WITH LEGACY EDGE DEVICES

(71) Applicant: Dell Products L.P., Round Rock, TX (US)

(72) Inventors: Mahesh Babu Ramaiah, Bangalore (IN); Sudhansu Sekhar Sahu, Bangalore (IN); Sunaina Ashok, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 269 days.

(21) Appl. No.: 18/492,865

(22) Filed: Oct. 24, 2023

(65) Prior Publication Data

US 2025/0131080 A1        Apr. 24, 2025

(51) Int. Cl.
| | |
|---|---|
| *G06F 21/44* | (2013.01) |
| *G06F 9/455* | (2018.01) |
| *G06F 21/60* | (2013.01) |

(52) U.S. Cl.
CPC .......... *G06F 21/44* (2013.01); *G06F 9/45558* (2013.01); *G06F 21/602* (2013.01); *G06F 2009/45562* (2013.01); *G06F 2009/4557* (2013.01)

(58) Field of Classification Search
CPC .... G06F 21/44; G06F 9/45558; G06F 21/602; G06F 2009/45562; G06F 2009/4557
See application file for complete search history.

(56) References Cited

U.S. PATENT DOCUMENTS

| | | | | |
|---|---|---|---|---|
| 6,223,234 B1 * | 4/2001 | Mahalingam | ......... | G06F 9/4411 |
| | | | | 710/1 |
| 6,247,079 B1 * | 6/2001 | Papa | ........................ | G06F 1/26 |
| | | | | 710/302 |
| 6,263,387 B1 * | 7/2001 | Chrabaszcz | ......... | G06F 13/4086 |
| | | | | 713/1 |
| 7,363,457 B1 * | 4/2008 | Dekoning | ............. | G06F 3/0607 |
| | | | | 711/170 |
| 7,493,438 B2 * | 2/2009 | Kaushik | .............. | G06F 13/4081 |
| | | | | 710/9 |
| 8,145,893 B2 * | 3/2012 | Narayanan | .......... | G06F 12/0875 |
| | | | | 711/170 |
| 8,291,123 B2 * | 10/2012 | Wight | ................... | G06F 13/385 |
| | | | | 710/3 |

(Continued)

OTHER PUBLICATIONS

Microsoft, "What is TPM?" https://support.microsoft.com/en-us/topic/what-is-tpm-705f241d-025d-4470-80c5-4feeb24fa1ee, Accessed Oct. 14, 2023, 2 pages.

(Continued)

*Primary Examiner* — Backhean Tiv
(74) *Attorney, Agent, or Firm* — Ryan, Mason & Lewis, LLP

(57) ABSTRACT

An apparatus comprises at least one processing device configured to identify an extended processing device and onboard the extended processing device to an edge infrastructure management platform, wherein the extended processing device is added as a component of a legacy device, and integrate the legacy device into the edge infrastructure management platform through one or more operations performed by the extended processing device.

20 Claims, 8 Drawing Sheets

(56)  References Cited

U.S. PATENT DOCUMENTS

| | | | | |
|---|---|---|---|---|
| 8,683,460 | B2 * | 3/2014 | Eisenhauer | G06F 8/65 |
| | | | | 717/172 |
| 8,997,182 | B2 * | 3/2015 | Jeong | H04L 69/329 |
| | | | | 713/168 |
| 9,934,187 | B2 * | 4/2018 | Shih | G06F 13/4081 |
| 11,327,918 | B2 * | 5/2022 | Chen | G06F 11/2038 |
| 11,469,953 | B2 * | 10/2022 | Browne | H04L 41/0897 |
| 12,075,525 | B2 * | 8/2024 | Saarnivala | H04L 67/12 |
| 2008/0077714 | A1 * | 3/2008 | Wight | G06F 13/385 |
| | | | | 710/18 |
| 2017/0302701 | A1 * | 10/2017 | Phanse | H04L 63/1416 |
| 2019/0179659 | A1 * | 6/2019 | Herbert | G06F 9/4856 |
| 2022/0393899 | A1 * | 12/2022 | Mimassi | G06Q 10/06398 |
| 2023/0350722 | A1 * | 11/2023 | Poornachandran | G06F 9/4881 |
| 2024/0231837 | A1 * | 7/2024 | Campi | G06F 9/4416 |
| 2025/0131080 | A1 * | 4/2025 | Ramaiah | G06F 9/45558 |

OTHER PUBLICATIONS

A. Mcdonald et al., "SmartNICs to xPUs: Why is the Use of Accelerators Accelerating?" Storage Networking Industry Association, May 19, 2022, 32 pages.

S. Zaharoff, "Brownfield (brownfield deployment, brownfield site)," https://www.techtarget.com/searchdatacenter/definition/brownfield-site, Accessed Mar. 23, 2022, 3 pages.

Cisco Systems, Inc., "How Do OT and IT Differ?" https://www.cisco.com/c/en/us/solutions/internet-of-things/what-is-ot-vs-it.html#:~:text=OT%20devices%20control%20the%20physical,systems%20manage%20data%20and%20applications., Accessed Oct. 14, 2023, 5 pages.

Geeks for Geeks, "Mount Command in Linux with Examples," https://www.geeksforgeeks.org/mount-command-in-linux-with-examples/, Accessed Oct. 16, 2023, 9 pages.

* cited by examiner

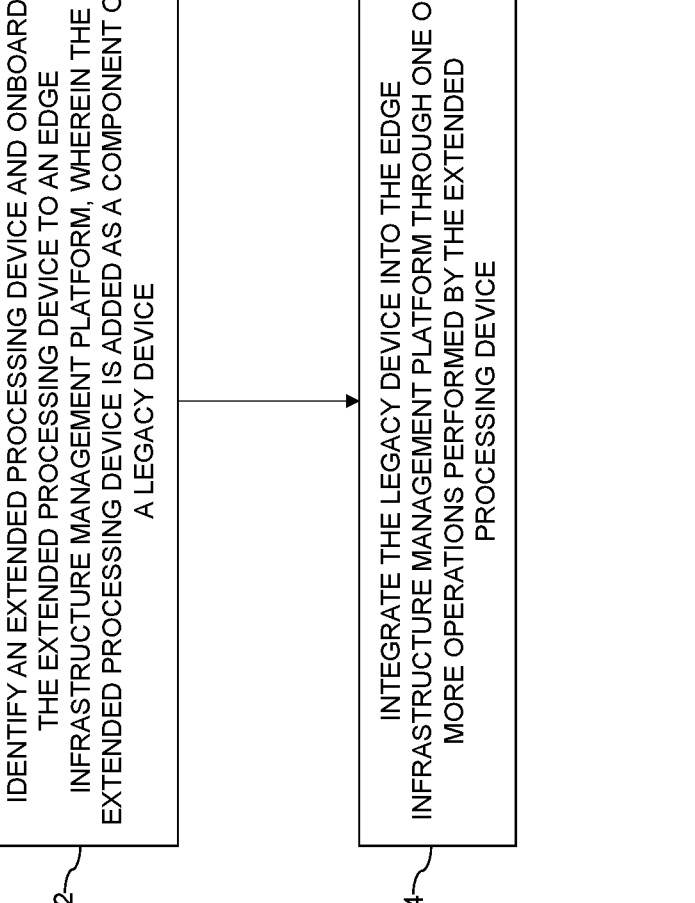

500

502 — IDENTIFY AN EXTENDED PROCESSING DEVICE AND ONBOARD THE EXTENDED PROCESSING DEVICE TO AN EDGE INFRASTRUCTURE MANAGEMENT PLATFORM, WHEREIN THE EXTENDED PROCESSING DEVICE IS ADDED AS A COMPONENT OF A LEGACY DEVICE

504 — INTEGRATE THE LEGACY DEVICE INTO THE EDGE INFRASTRUCTURE MANAGEMENT PLATFORM THROUGH ONE OR MORE OPERATIONS PERFORMED BY THE EXTENDED PROCESSING DEVICE

FIG. 5

MANAGEMENT OF EDGE COMPUTING NETWORK DEPLOYMENTS WITH LEGACY EDGE DEVICES

FIELD

The field relates generally to information processing, and more particularly to management of information processing systems comprising edge computing networks.

BACKGROUND

Historically, information technology (IT) and operational technology (OT) make up separate aspects of modern technology organizations. By way of example only, in a technology manufacturing organization such as an electronic equipment manufacturer, OT typically refers to systems that control manufacturing processes, while IT typically refers to systems that control data storage, communications, and computing. As such, organizations attempt to achieve IT/OT convergence. By way of example, IT/OT convergence refers to the integration of the systems that control manufacturing processes (OT) with the systems that control data storage, communications, and computing.

It is realized that a growing overlap between IT and OT can be attributed, at least in part, to the emergence of edge devices and related management solutions. However, in many organizations across the technology industry, management of edge devices has taken less precedence as compared to achieving IT/OT convergence.

SUMMARY

Illustrative embodiments provide techniques for management of edge computing network deployments with legacy edge devices.

In one embodiment, an apparatus comprises at least one processing device configured to identify an extended processing device and onboard the extended processing device to an edge infrastructure management platform, wherein the extended processing device is added as a component of a legacy device, and integrate the legacy device into the edge infrastructure management platform through one or more operations performed by the extended processing device.

These and other illustrative embodiments include, without limitation, methods, apparatus, networks, systems and processor-readable storage media.

BRIEF DESCRIPTION OF THE DRAWINGS

FIG. 5 is a flow diagram of an exemplary process for enabling management of edge computing network deployments with legacy edge devices in an illustrative embodiment.

DETAILED DESCRIPTION

Figure 1:
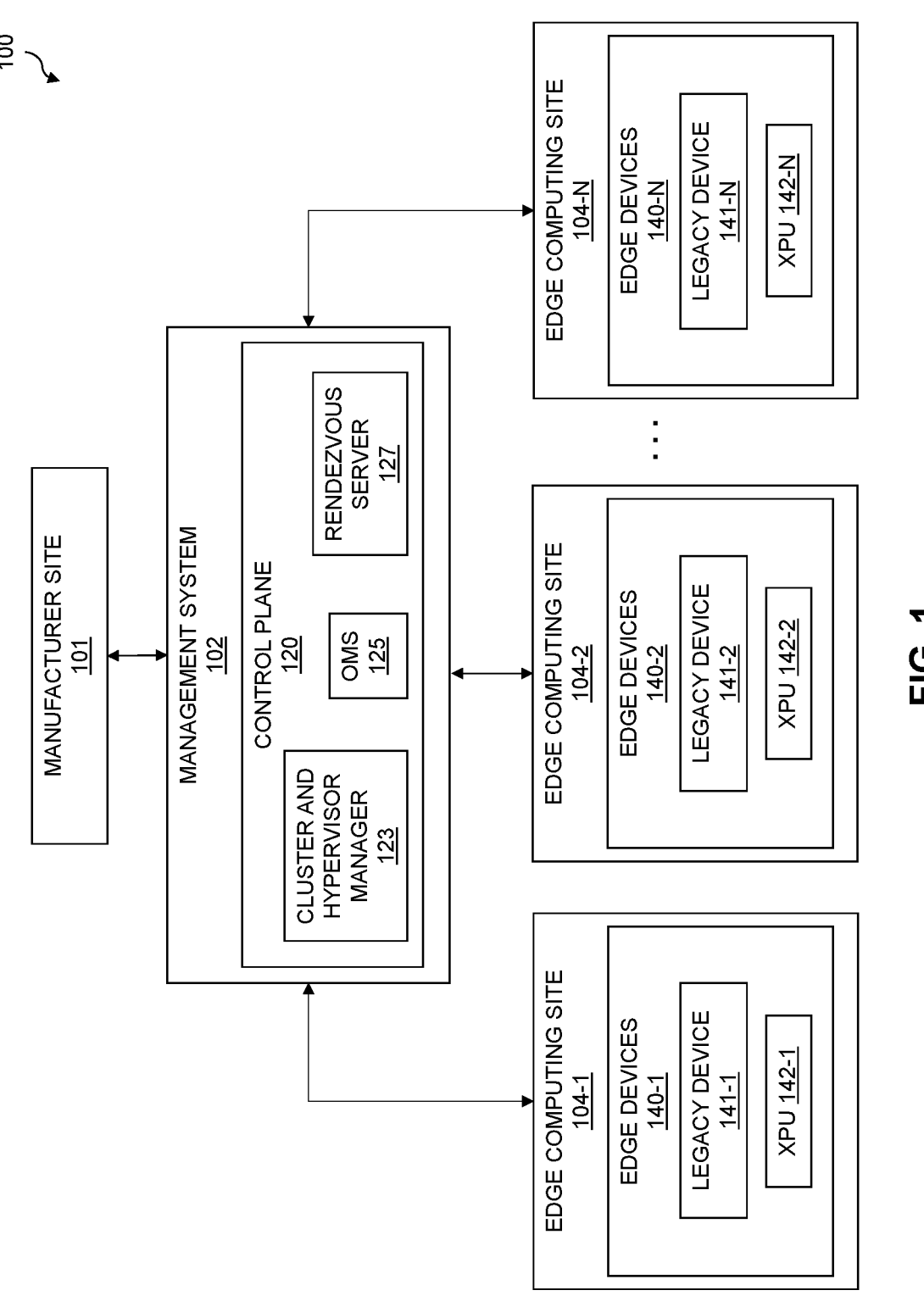
FIG. 1 is a block diagram of an information processing system configured for managing edge computing network deployments with legacy edge devices in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

An edge infrastructure management platform centralizes deployment and management of edge infrastructure and applications across geographically distributed locations. In illustrative embodiments, an edge infrastructure management platform securely scales edge operations using automation, open design, zero-trust security principles, and multi-cloud connectivity. A technical problem exists in that there exists a large amount of legacy edge devices which may not be compatible with current edge infrastructure management platforms or may require extensive upgrading, reconfiguration or replacement in order to interface with the edge infrastructure management platforms. As used herein a "legacy" device refers to an existing device (e.g., edge device) that may have been configured and was in use prior to the introduction of an edge infrastructure management platform, and requires modifications in order to be compatible and interface with the edge infrastructure management platform or other platform. As used herein, a "brownfield" deployment refers to an installation and configuration of new hardware or software that needs to or otherwise should coexist with legacy systems or devices (in contrast, a greenfield deployment is an installation and configuration of new hardware or software that is not dependent on legacy systems or devices).

Current approaches lack techniques to enable existing legacy systems and devices to be managed by an edge infrastructure management platform. Conventional approaches lack management and deployment strategies for migrating legacy devices in a brownfield deployment to be part of newly developed edge infrastructure management platforms.

In an effort to address the above-described technical issues, the illustrative embodiments advantageously provide an edge management solution to avoid replacement of legacy devices or re-performing legacy device onboarding. The illustrative embodiments provide techniques for integrating a legacy edge device with an edge infrastructure platform by utilizing extended data processing devices ("XPUs"). An extended data processing device includes, but is not necessarily limited to, a data processing unit (DPU), a neural processing unit (NPU), a smart network interface card (SmartNIC), an infrastructure processing unit (IPU), a function accelerator card (FAC) and a network attached processing unit (NAPU).

FIG. 1 shows an information processing system 100 configured in accordance with an illustrative embodiment. The information processing system 100 is assumed to be built on at least one processing platform and provides functionality for managing edge computing network deployments with legacy edge devices. As shown in FIG. 1, one or more edge computing sites 104-1, 104-2, . . . 104-N (collectively, edge computing sites 104) are connected to a management system 102. The management system 102 is connected to a manufacturer site 101 over one or more networks. In some embodiments, the management system 102 is remote from the edge computing sites 104 and connected to the edge computing sites 104 over one or more networks. In other embodiments, the management system 102 or one or more components thereof are part of one or more of the edge computing sites 104.

In illustrative embodiments, each of the edge computing sites 104 comprises edge devices 140-1, 140-2, . . . , 140-N (collectively, edge devices 140), which may be, for example, computing devices. The edge devices 140 at each edge computing site 104 comprise legacy devices 141-1, 141-2, . . . , 141-N (collectively legacy devices 141) and corresponding extended processing devices ("XPUs) 142-1, 142-2, . . . , 142-N (collectively XPUs 142). Although one legacy device 141 and one XPU 142 is shown in each of the edge computing sites 104, the embodiments are not necessarily limited thereto, and multiple legacy devices 141 and corresponding XPUs 142 may be components of each of the edge computing sites 104. As used herein, a "computing site" refers to a compute endpoint (e.g., edge compute endpoint (ECE)) comprising, but not necessarily limited to, servers, gateways and/or computers located at a location where computing occurs.

The edge computing sites 104 may represent different customer sites or other data centers or computing sites that may be remote from the management system 102. As noted herein above, in some embodiments, however, one or more of the edge computing sites 104 may be co-located with the management system 102 (e.g., at a same data center, a same cloud infrastructure, etc.). The management system 102 comprises a control plane 120 including, but not necessarily limited to, a cluster and hypervisor manager 123, an onboarding management system (OMS) 125 and a rendezvous server 127. The management system 102 is assumed to further comprise a plurality of devices or nodes (e.g., physical and virtual computing resources or other information technology (IT) assets not shown in FIG. 1) that implement the control plane 120 including the OMS 125 (e.g., onboarding service) providing zero touch provisioning logic, enabling provisioning and configuration of sets of edge devices 140 deployed at the edge computing sites 104. As described in more detail herein in connection with FIGS. 2 and 3, the XPUs 142 implement instances of zero touch provisioning logic to onboard the XPUs 142 to an edge infrastructure management platform managed by the management system 102. The onboarding is performed through secure communication with the control plane 120 of the management system 102. The instances of zero touch provisioning logic may be, for example, software and/or firmware-based.

As used herein, "zero touch" provisioning refers to configuration or other provisioning of a computing device that does not require manual intervention. Thus, zero touch provisioning enables the computing device to be configured or otherwise provisioned without needing a human operator to physically type or otherwise provide input into a system console of the computing device being provisioned. As described in further detail below, zero touch provisioning in some cases only requires that a computing device be placed in some desired location and connected to power and be configured to connect to a network (e.g., either via a physical network cable or via a wireless network interface). Zero touch provisioning advantageously enables provisioning of a computing device remotely (e.g., from a control plane 120 of the management system 102) and automatically.

The legacy devices 141 or other edge devices 140 not shown may comprise, for example, physical computing devices such as Internet of Things (IoT) devices, mobile telephones, laptop computers, tablet computers, desktop computers or other types of devices. As noted hereinabove, the XPUs 142 include, for example, DPUs, NPUs, SmartNICs, IPUs, FACs and/or NAPUs. The edge devices 140 including the legacy devices 141 and the XPUs 142 are examples of what are more generally referred to herein as "processing devices." Some of these processing devices are also generally referred to herein as "computers." The edge devices 140 may also or alternately comprise virtualized computing resources, such as virtual machines (VMs), containers, etc.

The edge devices 140 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The manufacturer site 101 is connected to the management system 102. As explained in more detail herein, at the time of manufacture, device-specific credentials are created within the XPUs 142 or other edge devices 140, and are shared with the device manufacturer in the form of private keys. It is to be understood that the legacy devices 141 existed in the edge computing sites 104 prior to the addition of the XPUs 142 and were onboarded prior to the XPUs 142 to a different system in a similar manner to that as will be described in connection with the onboarding of the XPUs 142 or were onboarded using different techniques. The illustrative embodiments are described in connection with the onboarding of the XPUs 142 to the edge infrastructure management platform (e.g., management system 102). Such onboarding techniques to the edge infrastructure management platform may also be applicable to other edge devices 140 that may be new additions to the edge computing site 104.

Figure 2:
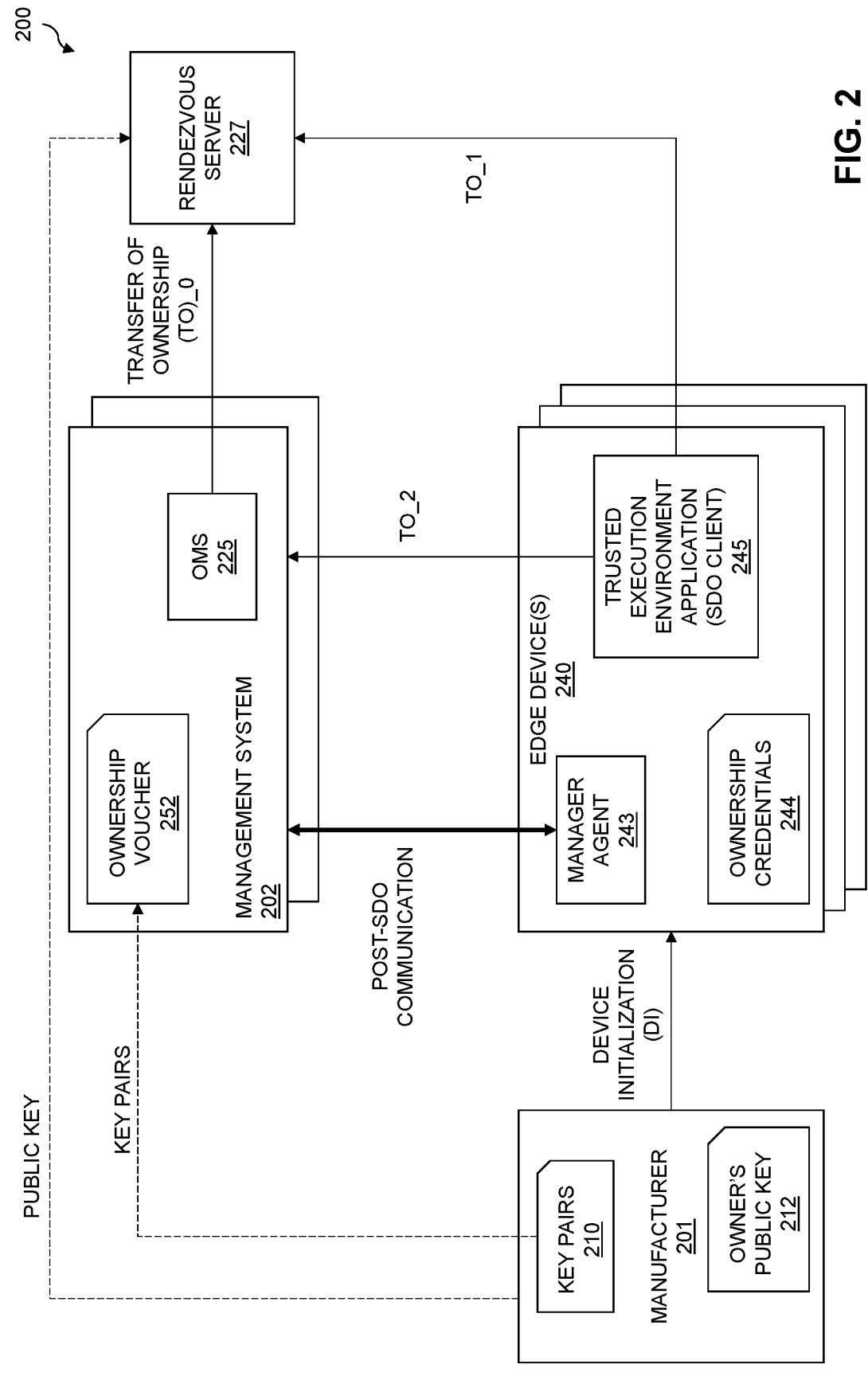
FIG. 2 shows a system flow for a secure device onboarding protocol that may be enabled utilizing zero touch provisioning in an illustrative embodiment.

Referring to FIG. 2, in illustrative embodiments, asymmetric public keys corresponding to the private keys (e.g., public keys of public-private key pairs) identifying edge devices 240 (e.g., XPUs 142 and other edge devices 140 that may be new additions to the edge computing site 104) and ownership credentials 244 are placed into a cryptographically attested digital document called an ownership voucher 252 which identifies an edge device 240. The ownership voucher 252 is sent to the management system 202, which is the same as or similar to the management system 102. The management system 102/202 corresponds to an owner entity and its related systems and services through which a given edge device 140/240 is intended to operate. For example, device identity information captured at the time of manufacturing is made available to the owner entity (via management system 102/202), and any corresponding control planes and systems (e.g., control plane 120 and OMS 125/225). The OMS 225 and the rendezvous server 227 in FIG. 2 may be the same as or similar to the OMS 125 and the rendezvous server 127 in FIG. 1. In addition, the manufacturer 201 may be the same as or similar to the manufacturer site 101 in FIG. 1.

Networks coupling the edge computing sites 104 with the management system 102, coupling the manufacturer site 101 with the management system 102, coupling the edge devices 240 with the manufacturer 201 and/or with the management system 202, and/or coupling the manufacturer 201 with the management system 202 are assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

In some embodiments, the management system 102/202 and edge computing sites 104 collectively provide at least a portion of an information technology (IT) infrastructure operated by an enterprise. The IT infrastructure comprising the management system 102/202 and edge computing sites 104 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of the management system 102/202 and/or edge computing sites 104. A given enterprise system may host assets that are associated with multiple enterprises (e.g., two or more different businesses, organizations or other entities). For example, in some cases different ones of the edge computing sites 104 are associated with different enterprises (e.g., different customers or end-users) which purchase devices from another enterprise that is an operator of the management system 102/202 (e.g., a manufacturer or vendor of the edge devices 140/240 deployed at the edge computing sites 104).

Although not explicitly shown in FIG. 1, one or more input-output devices such as keyboards, displays or other types of input-output devices may be used to support one or more user interfaces to the management system 102/202 and edge computing sites 104, as well as to support communication between the management system 102/202, the edge computing sites 104, and other related systems and devices not explicitly shown.

When edge devices 140/240 of an edge computing site 104 are connected to a network, a zero touch onboarding process can be performed to connect the edge devices 140/240 to the management system 102 via a secure device onboard connection. In illustrative embodiments, Fast ID Online (FIDO) Device Onboarding (FDO) is leveraged to enable zero touch onboarding, which is performed via firmware-based and/or runtime agents. The zero touch onboarding process provides a bootstrapping strategy enabling computing devices (e.g., XPUs 142 and other edge devices 140 that may be new additions to the edge computing site 104) to securely obtain bootstrapping data with no installer action beyond physical placement and connecting network and power cables. As such, the zero touch onboarding processes enable non-technical personnel to bring up computing devices in remote locations without the need for any operator input. The zero touch onboarding processes provide functionality for updating a boot image, committing an initial configuration, and executing arbitrary scripts to address auxiliary needs on computing devices. The updated computing devices are subsequently able to establish secure connections with other systems. Zero touch onboarding processes provide a mechanism for defining a computing device's "good security posture" as described herein. For example, a bare-metal computing device holds a firmware-based secure boot ROM (e.g., a Universal Extensible Firmware Interface (UEFI) secure boot ROM), and the system as a whole is capable of Trusted Platform Module (TPM)-based Integrity Measurement Architecture (IMA) for measuring boot security, where each boot stage is reported into the TPM's Platform Configuration Register (PCR) registers. IMA security may be defined using various Trusted Computing Group (TCG) Extensible Firmware Interface (EFI) Platform and Protocol specifications. With IMA security, it is possible to assure a high level of confidence regarding: (1) platform consistency and integrity (e.g., a failure of IMA will fail the boot process and initiate a recovery); and (2) device trustworthiness that can be communicated to the control plane.

FIG. 2 shows a system flow 200 for a secure device onboarding (SDO) protocol that may be enabled utilizing zero touch provisioning. Referring to FIG. 2, an FDO or other SDO protocol involves the manufacturer 201, one or more edge devices 240, the management system 202 operated by a manager (or owner) and the rendezvous server 227. The manufacturer 201 manufactures the edge devices 240. The manufacturer 201 has an associated key pair 210 and the owner's public key 212. The edge devices 240 implement a manager agent 243 and a trusted execution environment (TEE) application (e.g., an FDO/SDO client 245), and have ownership credentials 244. The management system 202 implements the OMS 225 and has an ownership voucher 252 for each of the edge devices 240 provided to the management system 202 from the manufacturer 201. The edge devices 240 may be shipped from the manufacturer 201 (e.g., to one or more customer locations) independent of the ownership voucher 252, and ownership may be transferred multiple times until the edge devices 240 are powered on. The rendezvous server 227 enables multiple instances of the management system 202 to each register a range of devices which that management system 202 owns. Device initialization (DI) includes the key pair 210 of the manufacturer 201 being used to create an initial credential and ownership voucher. The manufacturer 201's certificate (e.g., the owner's public key 212) is published to the rendezvous server 227. A device string is configured by the manufacturer 201 and rendezvous server 227's uniform resource locator (URL). As used herein, a "certificate" refers to a data file that includes information for verifying the identity of a device (e.g., server, edge device (client)). The information includes, for example, the public key, an identification of the issuing authority of the certificate (e.g., certificate authority), and an expiration date of the certificate. A handshake refers to a process for verifying a certificate and a device's possession of the private key. The handshake can also establish how encryption will take place once the handshake is finished.

The manufacturer 201 is connected to the management system 202. At the time of manufacture, device credentials specific to the edge devices 240 are created within the edge devices 240, and are shared with the manufacturer 201 in the form of, for example, private keys. In illustrative embodiments, the asymmetric public keys corresponding to the private keys identifying the edge devices 240 (e.g., public keys of public-private key pairs) and ownership credentials 244 are placed into a cryptographically attested digital document called an ownership voucher 252, which identifies a given edge device 240. The ownership voucher 252 is sent to management system 202 so that when a given edge device 240 is ready to be onboarded, the edge device 240 can be verified. In other words, any device identity information captured at the time of manufacturing (e.g., in the form of public keys of public-private key pairs) is made available to the management system 202 and its associated control planes and systems in which the corresponding edge devices 240 will operate.

In illustrative embodiments, device credentials include a private key that is provisioned into a given edge device 240 (e.g., when a CPU or motherboard is manufactured) for establishing trust for a restricted operating environment (ROE) that runs on the device. A digital signature by the private key provides evidence of code being executed in the ROE. The ownership credentials 244 comprise, for example, a key pair 210 that serves to identify a current owner of a given edge device 240. When an edge device 240 is manufactured, the manufacturer 201 uses the key pair 210 as an initial ownership credential 244, which is replaceable with new ownership credentials 244 when ownership is transferred.

Transfer of ownership (TO) will now be described in more detail. TO may involve multiple steps or phases, denoted TO_0, TO_1 and TO_2. In TO_0, the OMS 225 has the device ID, ownership voucher 252, private key and IP address of the management system 202. The OMS 225 registers with the rendezvous server 227 using the device ID and ownership voucher 252. The rendezvous server 227 verifies the manufacturer 201's public key from the ownership voucher 252, and sets a timer to wait for TO_1. If an edge device 240 does not contact the rendezvous server 227 within a set time interval, the rendezvous server 227 clears registration and the OMS 225 must repeat TO_0. TO_1 includes the edge device 240 contacting the rendezvous server 227 with the device ID, and the rendezvous server 227 returning the management system's URL. TO_2 includes the edge device 240 reaching out to the OMS 225. The management system 202 proves possession of the private key to the edge device 240, and sends the ownership voucher 252 to the edge device 240. The edge device 240 verifies the chain of trust in the ownership voucher 252, and the management system 202 resets the credentials. The management system 202 and edge device 240 may then perform any required post-SDO communication.

The rendezvous server 227 may provide various discovery options, including those specified in: Internet Engineering Task Force (IETF) Request for Comments (RFC) 8572 Secure Zero Touch Provisioning (SZTP)-DHCP option via 143 SZTP server address; IETF RFC 8552 Scoped Interpretation of DNS Resource Records through "Underscored" Naming of Attribute Leaves-DNS resource record locator; etc. In some embodiments, the rendezvous server 227 may have URLs "rendezvous.customer.com" and "rendezvous.provider.com" where "provider" may be the name of the manufacturer 201, the manager/owner of the management system 202, etc. For air-gapped devices, Yubico® or a 4G-enabled gateway may be utilized. Yubico Yubikey®, for example, may utilize OpenPGP, Open Authentication Time-Based One-Time Password (OATH-TOTP), a Personal Identity Verification (PIV) smartcard interface, FIDO Universal 2nd Factor Authentication (U2F) or FIDO2, and configuration sets for enabling authentication in air-gapped device scenarios.

Figure 3:
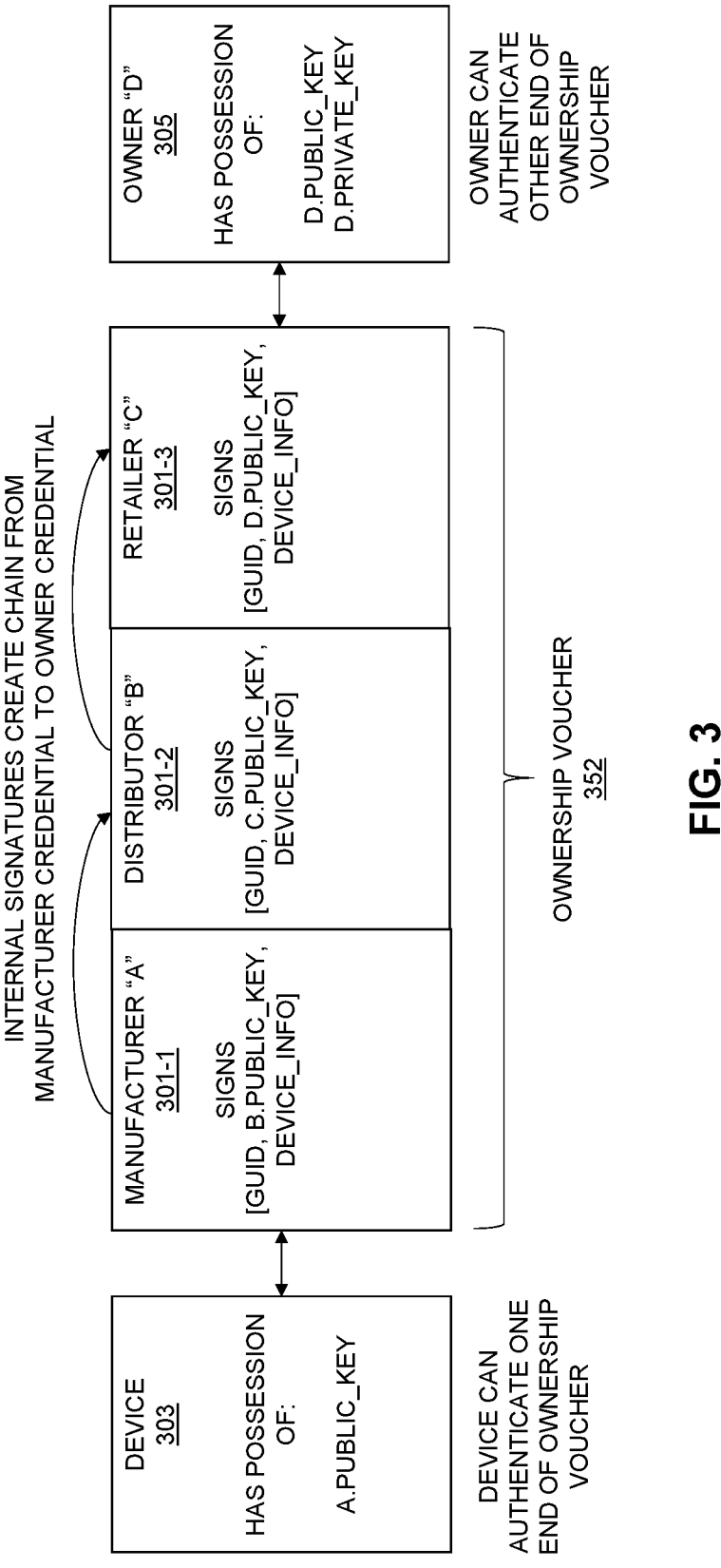
FIG. 3 shows generation of an ownership voucher utilized in secure device onboarding of computing devices in an illustrative embodiment.

FIG. 3 illustrates details of an ownership voucher 352 that is processed by a manufacturer "A" 301-1, a distributor "B" 301-2, and a retailer "C" 301-3. The manufacturer 301-1, distributor 301-2, and retailer 301-3 provide internal signatures which create a chain from the manufacturer to owner credential in the ownership voucher. The manufacturer 301-1 signs the ownership voucher 352 with [GUID, B.Public_Key, Device_Info], the distributor 301-2 signs the ownership voucher 352 with [GUID, C.Public_Key, Device_Info], and the retailer 301-3 signs the ownership voucher 352 with [GUID, D.Public_Key, Device_Info]. The device 303 can authenticate one end of the ownership voucher 352, as it has possession of A.Public_Key. The owner "D" 305 can authenticate the other end of the ownership voucher 352, as it has possession of D.Public_Key and D.Private_Key. The ownership voucher 352 is a structured digital document that links the manufacturer 301-1 with the owner 305, and includes a chain of signed public keys. Each signature of a public key authorizes the possessor of the corresponding private key to take ownership of the device 303 or pass ownership through another link in the chain. The signatures in the ownership voucher 352 thereby create a chain of trust from the manufacturer 301 to the owner 305.

Ownership voucher signing includes initializing a TEE with a hash of the manufacturer 301-1 public key (A.Public_Key). Voucher signing includes encoding the owner 305's public key and signing using the manufacturer 301-1's private key, and updating the ownership voucher 352. The first transfer (e.g., from a first owner to a second owner) of the ownership voucher 352 includes encoding the second owner's public key and signing using the first owner's private key, and updating the voucher. In the FIG. 3 example, the transfer between the manufacturer 301-1 and the distributor 301-2 would thus include the manufacturer 301-1 encoding the distributor 301-2's public key (B.Public_Key) and signing using the manufacturer 301-1's private key (A.Private_Key). Similar processing would be utilized for transfer of the ownership voucher 352 from the distributor 301-2 to the retailer 301-3, and so on.

Verification of the ownership voucher 352 may proceed as follows. The owner 305 may sign a nonce using its private key (D.Private_Key), and send the ownership voucher 352 with the signature (the signed nonce) to the device 303. The device 303 verifies the nonce using the owner 305's public key (D.Public_Key), which verifies that the owner 305 has the corresponding private key (D.Private_Key). The device 303 then gets the manufacturer 301-1's public key (A.Public_Key) from the first entry of the ownership voucher 352, and verifies the hash of the manufacturer 301-1's public key stored in its TEE. The device 303 can then verify the signatures of the ownership voucher 352 in sequence, until it comes to the owner 305's public key (D.Public_Key), which is the last entry of the ownership voucher 352. This means that the chain of ownership is trusted.

As noted hereinabove, the illustrative embodiments advantageously provide an edge management solution to avoid replacement of legacy devices or re-performing legacy device onboarding. In more detail, the illustrative embodiments provide techniques for integrating legacy edge device with an edge infrastructure platform by utilizing XPUs. Referring to the system flows 410 and 411 in FIGS. 4A and 4B, an XPU 442 with TPM or other secure infrastructure capability is used to integrate a legacy device 441 into an edge infrastructure management platform, so that the infrastructure can be controlled and managed by a control plane 420 of the edge infrastructure management platform. Although one legacy device 441 and one XPU 442 is shown in FIGS. 4A and 4B, the embodiments are not necessarily limited thereto, and multiple XPUs 442 can be used to integrate multiple legacy devices 441 into an edge infrastructure management platform.

Figure 4A:
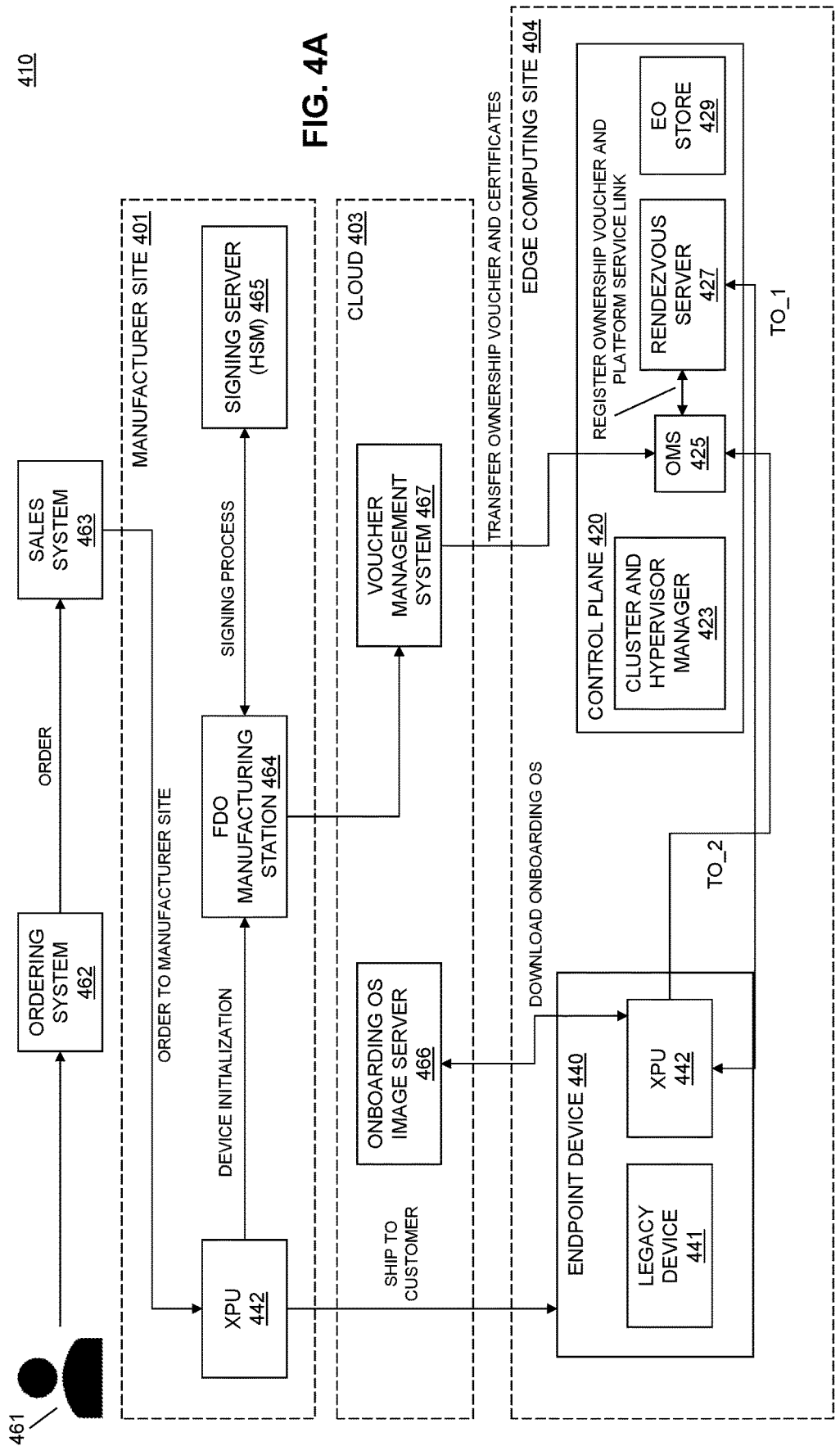
FIG. 4A shows a system flow for ordering, initializing and onboarding an extended processing device in an illustrative embodiment.
Figure 4B:
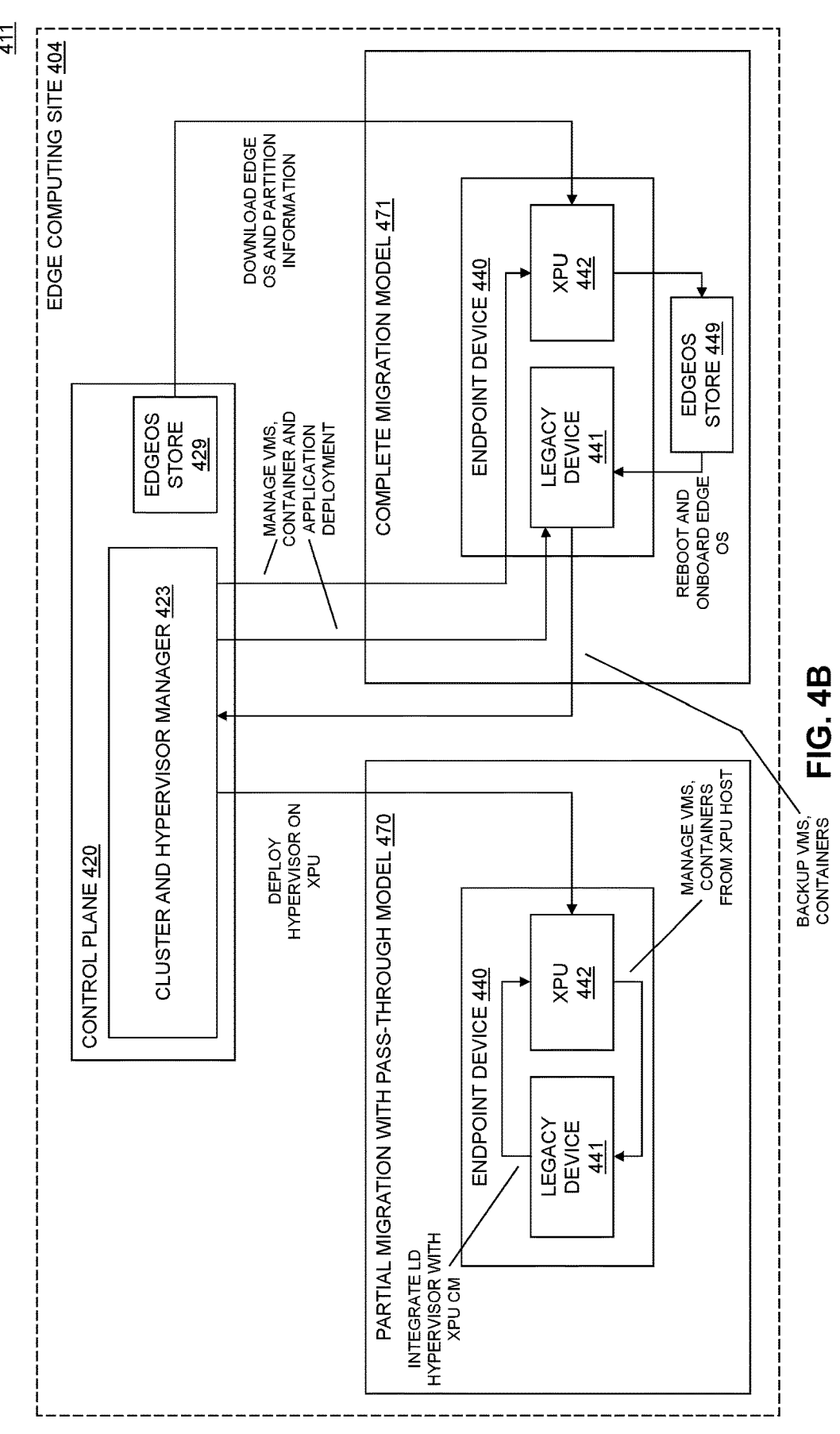
FIG. 4B shows a system flow for integrating a legacy device into an edge infrastructure management platform through one or more operations performed by an extended processing device in an illustrative embodiment.

FIG. 4A shows a system flow 410 for ordering, initializing and onboarding an XPU 442. Referring to FIG. 4A, a user 461 (e.g., customer) orders an XPU 442 via an ordering system 462, which completes an order and sale for the XPU 442 from a sales system 463. At a manufacturer site 401, which is the same or similar to the manufacturer site 101 and manufacturer 201, device initialization is performed for the XPU 442 at an FDO manufacturing station 464. The device initialization is the same or similar to the device initialization (DI) described in connection with FIG. 2. For example, a key pair of a manufacturer of the XPU 442 is used to create an initial credential and ownership voucher. The ownership voucher comprises a digital certificate including a data file that includes information for verifying the identity of the XPU 442. The verifying information includes, for example, the public key, an identification of the issuing authority of the certificate (e.g., certificate authority), and an expiration date of the certificate. The ownership voucher, which includes ownership credentials to identify the XPU 442 is signed (e.g., cryptographically attested) via a signing server (hardware security module (HSM)) 465 and, along with any other digital certificates, is sent to the OMS 425 of the control plane 420 via a cloud-based (e.g., cloud 403) voucher management system 467. The control plane 420 is a component of a management system (e.g., edge infrastructure management platform) such as, for example, management system 102/202. As can be seen in FIG. 4A, the XPU 442 is shipped to an edge computing site 404 (which is the same or similar to an edge computing site 104). In addition to creating and verifying digital signatures, the signing server 465 may also be configured to generate keys, encrypt and decrypt data, and manage encryption keys.

As noted hereinabove, the processes performed by the FDO manufacturing station 464 and signing server 465 on the XPU 442 include attestation, key generation (e.g., TPM key generation) and ownership voucher creation. The ownership voucher can be created through a manufacturing OS or an electronic file interchange (EFI) application. The processes ensure that the XPU 442 is loaded with a basic input/output system (BIOS) that can fetch an onboarding OS image from an onboarding OS image server 466 or an XPU flash drive. The OS image can be accessible to the XPU 442 using a preboot execution environment (PXE) and/or an HTTPs boot feature. A PXE boot uses User Datagram Protocol (UDP). The HTTPs boot feature permits a system to download and install an operating system using a secure gateway. The Unified Extensible Firmware Interface (UEFI) network stack in BIOS settings must be enabled to initiate the HTTPs boot feature.

The XPU 442 is added to a legacy device 441 of the edge computing site 404. An endpoint device 440 comprises the combination of the legacy device 441 and XPU 442. Upon powering on of the XPU 442, as part of an enumeration process the XPU 442 is discovered and booting of the primary host (e.g., the legacy device 441) is stalled until the XPU 442 is completely onboarded to the edge infrastructure management platform. In an initial step of the onboarding process, an onboarding OS image is downloaded from the onboarding OS image server 466 and day 1 and day 2 operations are executed.

The voucher management system 467 transfers ownership vouchers and certificates to the OMS 425, and the OMS 425 registers the ownership voucher and a platform service link (e.g., management site URL) with the rendezvous server 427. Similar to the operations described in connection with FIG. 2, transfer of ownership (TO) operations are performed. In TO_0, the OMS 425 has the device ID, ownership voucher and private key of the XPU 442, and registers with the rendezvous server 427 using the device ID and ownership voucher. The rendezvous server 427 verifies the manufacturer's public key from the ownership voucher, and sets a timer to wait for TO_1. If the XPU 442 does not contact the rendezvous server 427 within a set time interval, the rendezvous server 427 clears registration and the OMS 425 must repeat TO_0. TO_1 includes the XPU 442 contacting the rendezvous server 427 with the device ID, and the rendezvous server 427 returning the management site's URL. TO_2 includes the XPU 442 reaching out to the OMS 425. The management site (e.g., OMS 425) proves possession of the private key to the XPU 442, and sends the ownership voucher to the XPU 442. The XPU 442 verifies the chain of trust in the ownership voucher, and the management site (e.g., OMS 425) resets the credentials. The OMS 425 and XPU 442 may then perform any required post-SDO communication.

The control plane 420 identifies and onboards the XPU 442, including providing the XPU 442 with an operating system of the edge infrastructure management platform (EdgeOS) and related management software (e.g., hypervisor and cluster management software). The related management software configures a platform of the XPU 442 to host virtual machines (VMs) and/or containers with applications, as per a user deployment strategy. Depending on implementation, the hypervisor management software on the XPU 442 can control and manage hypervisors running on the XPU 442 and/or the legacy device 441. Once onboarding of the XPU 442 is complete, the control shifts back to legacy device 441 to finish booting of the legacy device OS and/or legacy device hypervisor.

FIG. 4B shows a system flow 411 for integrating the legacy device 441 into an edge infrastructure management platform through one or more operations performed by the XPU 442. The integration (also referred to herein as a "migration") is achieved through a partial migration with pass-through model 470 where the XPU functions as an ECE, or a complete migration model 471, where the XPU 442 functions as the primary endpoint device.

In the partial migration with pass-through model 470, the cluster and hypervisor manager 423 deploys a hypervisor on the XPU 442. The XPU 442 (e.g., the hypervisor and/or other XPU components) processes one or more requests to deploy at least one of one or more VMs, one or more containers and one or more applications on the legacy device 441. In addition, the XPU 442 (e.g., the hypervisor and/or other XPU components) manages the VMs, containers and/or applications for the legacy device 441. The XPU 442 processes the requests when they are received through the edge infrastructure management platform (e.g., through the control plane 420), and blocks requests initiated through sources other than the edge infrastructure management platform (e.g., through the legacy device 441 or other sources outside of the edge infrastructure management platform). In one or more embodiments, the native hypervisor and VMs running on the legacy device 441 are discovered and integrated with the cluster and hypervisor manager 423. In addition, the native hypervisor of the legacy device 441 is managed by the cluster and hypervisor manager 423. Such management by the cluster and hypervisor manager 423 can be performed through the hypervisor deployed on the XPU 442. In the partial migration with pass-through model 470, the OS and BIOS contained by the legacy device 441 are managed outside of the edge infrastructure management platform.

In the complete migration model 471, the XPU 442 is provided with one or more onboarding credentials, and the XPU 442 is configured to use the one or more onboarding credentials to perform re-onboarding in response to a failure of the operating system of the edge infrastructure management platform. For example, the XPU 442 may re-onboard one or more devices to the edge infrastructure management platform following a failure. In the complete migration model 471, the control plane 420 may provide the XPU 442 with hypervisor management software and/or cluster management software. In illustrative embodiments, the control plane 420 takes one or more snapshots of one or more virtual machines running on an operating system of the legacy device 441, and migrates the one or more snapshots to a hypervisor running on the XPU 442.

In the complete migration model 471, the control plane 420 and/or the XPU 442 boots an operating system of the edge infrastructure management platform onto the legacy device 441. The booting comprises defining at least one of one or more partitions, cryptographic attestations and security corresponding to the operating system of the edge infrastructure management platform as part of a mount and boot workflow. As can be seen in FIG. 4B, EdgeOS store instances 429 and 449 respectively from the control plane 420 and local to the endpoint device 440 send and receive an edge infrastructure management platform operating system (EdgeOS) and partition information so that the legacy device 441 can be rebooted and onboarded with the EdgeOS and partition information. As a result, the EdgeOS on the XPU 442 functions as the primary endpoint device, while the EdgeOS hosted by the legacy device 441 functions as the secondary endpoint device. The primary and secondary EdgeOS instances are managed by the control plane 420. As the secondary EdgeOS, the EdgeOS hosted by the legacy device 441 may require authorization to perform one or more operations. In the illustrative embodiments of FIGS. 4A and 4B, the control plane 420 is part of the edge computing site 404. Alternatively, as noted hereinabove, the control plane 420 may be remote from the edge computing site 404 and connected to the edge computing site 404 over one or more networks.

An exemplary process for enabling management of edge computing network deployments with legacy edge devices will now be described in more detail with reference to the flow diagram of FIG. 5. It is to be understood that this particular process is only an example, and that additional or alternative processes for enabling management of edge computing network deployments with legacy edge devices may be used in other embodiments.

In this embodiment, the process 500 includes steps 502 through 504. These steps are assumed to be performed by one or more elements of the management system 102/202 including the control plane 120/420, the edge devices 140/240, endpoint devices 440 or other elements described in the information processing system 100 and system flows 200, 410 and 411. The process begins with step 502, where an extended processing device (e.g., XPU 142/442) is identified and onboarded to an edge infrastructure management platform. The extended processing device is added as a component of a legacy device (e.g., legacy device 141/441). In step 504, the legacy device is integrated into the edge infrastructure management platform through one or more operations performed by the extended processing device.

The extended processing device may comprise, for example, a DPU, an NPU, a SmartNIC, an IPU, an FAC and/or an NAPU.

In illustrative embodiments, the extended processing device is configured with an operating system of the edge infrastructure management platform and one or more onboarding credentials, which can be used by the extended processing device to perform re-onboarding in response to a failure of the operating system of the edge infrastructure management platform. The extended processing device is further configured with at least one of hypervisor management software and cluster management software.

In the complete migration model 471, the control plane 120/420 takes one or more snapshots of one or more virtual machines running on an operating system of the legacy device 141/441, and migrates the one or more snapshots to a hypervisor running on the XPU 142/442. The XPU 142/442 may be responsible for booting an operating system of the edge infrastructure management platform onto the legacy device 141/441, wherein the booting comprises defining at least one of one or more partitions, cryptographic attestations and security corresponding to the operating system of the edge infrastructure management platform as part of a mount and boot workflow.

In the partial migration with pass-through model 470, the XPU 142/442 processes one or more requests to deploy at least one of one or more virtual machines, one or more containers and one or more applications on the legacy device 141/441, and a hypervisor is deployed on the XPU 142/442 to process the one or more requests, which are initiated through the edge infrastructure management platform (e.g., control plane 120/420). The XPU 142/442 blocks one or more additional requests to deploy at least one of one or more additional virtual machines, one or more additional containers and one or more additional applications on the legacy device 141/441, wherein the one or more additional requests are initiated through a source other than the edge infrastructure management platform. The XPU 142/442 may be configured to manage a hypervisor of the legacy device 141/441.

Databases or data stores for maintaining keys, credentials, ownership vouchers, operating systems, partition information, etc., may be implemented using one or more of storage systems that are part of or otherwise associated with one or more of the information processing system 100 and/or system flows 410 and 411. The storage systems may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

The embodiments advantageously provide techniques to avoid replacement of legacy devices or re-performing legacy device onboarding. The illustrative embodiments integrate legacy edge devices with edge infrastructure platforms by utilizing XPUs to perform functions on behalf of legacy edge devices in partial and complete migration models. The embodiments provide, for example, a tunnelling model to onboard systems and subsystems of a cluster as individual edge compute endpoints. As an additional advantage, the embodiments provide a mechanism to onboard legacy devices of a brownfield deployment to an edge ecosystem through extended processing devices.

Referring back to FIGS. 1, 2, 4A and 4B, although there are elements that are depicted as being part of the management systems 102/202 and edge computing sites 104/404 in the FIG. 1, FIG. 2, FIG. 4A and FIG. 4B embodiments, such elements or at least a portion thereof may in other embodiments be implemented at least in part externally to the management systems 102/202 and/or edge computing sites 104/404, for example, as a stand-alone server, set of servers or other type of system coupled via one or more networks to the management systems 102/202 and/or edge computing sites 104/404.

The management systems 102/202, control planes 120/420, cluster and hypervisor managers 123/423, OMSs 125/225/425, rendezvous servers 127/227/427, devices 140/240/440 (including legacy devices 141/441, XPUs 142/442), EdgeOS stores 429/449 and other elements in the FIG. 1, FIG. 2, FIG. 4A and FIG. 4B embodiments are assumed to be implemented using at least one processing device. Each such processing device generally comprises at least one processor and an associated memory, and implements at least a portion of the functionality of, for example, the management systems 102/202, control planes 120/420, cluster and hypervisor managers 123/423, OMSs 125/225/425, rendezvous servers 127/227/427, devices 140/240/440 (including legacy devices 141/441, XPUs 142/442), EdgeOS stores 429/449 and other elements in the FIG. 1, FIG. 2, FIG. 4A and FIG. 4B embodiments.

It is to be appreciated that the particular arrangement of the management systems 102/202, control planes 120/420, cluster and hypervisor managers 123/423, OMSs 125/225/425, rendezvous servers 127/227/427, devices 140/240/440 (including legacy devices 141/441, XPUs 142/442), EdgeOS stores 429/449 and other elements in the FIG. 1, FIG. 2, FIG. 4A and FIG. 4B embodiments is presented by way of example only, and alternative arrangements can be used in other embodiments. As discussed above, for example, elements that are depicted as being part of the management systems 102/202 and edge computing sites 104/404 in the FIG. 1, FIG. 2, FIG. 4A and FIG. 4B embodiments may be implemented at least in part external to the management systems 102/202 and edge computing sites 104/404. At least a portion of the functionality of, for example, the management systems 102/202, control planes 120/420, cluster and hypervisor managers 123/423, OMSs 125/225/425, rendezvous servers 127/227/427, devices 140/240/440 (including legacy devices 141/441, XPUs 142/442), EdgeOS stores 429/449 and other elements in the FIG. 1, FIG. 2, FIG. 4A and FIG. 4B embodiments may be implemented at least in part in the form of software that is stored in memory and executed by a processor.

It is to be understood that the particular set of elements shown in FIGS. 1, 2, 4A and 4B are presented by way of illustrative example only, and in other embodiments additional or alternative elements may be used. Thus, another embodiment may include additional or alternative systems, devices and other network entities, as well as different arrangements of modules and other components.

The management systems 102/202, control planes 120/420, cluster and hypervisor managers 123/423, OMSs 125/225/425, rendezvous servers 127/227/427, devices 140/240/440 (including legacy devices 141/441, XPUs 142/442), EdgeOS stores 429/449 and other elements in the FIG. 1, FIG. 2, FIG. 4A and FIG. 4B embodiments, as described above and in further detail below, may be part of a cloud infrastructure.

The management systems 102/202, control planes 120/420, cluster and hypervisor managers 123/423, OMSs 125/225/425, rendezvous servers 127/227/427, devices 140/240/440 (including legacy devices 141/441, XPUs 142/442), EdgeOS stores 429/449 and other elements in the FIG. 1, FIG. 2, FIG. 4A and FIG. 4B embodiments are assumed to be implemented using at least one processing platform comprising one or more processing devices each having a processor coupled to a memory. Such processing devices can illustratively include particular arrangements of compute, storage and network resources.

The management systems 102/202, control planes 120/420, cluster and hypervisor managers 123/423, OMSs 125/225/425, rendezvous servers 127/227/427, devices 140/240/440 (including legacy devices 141/441, XPUs 142/442), EdgeOS stores 429/449 and other elements in the FIG. 1, FIG. 2, FIG. 4A and FIG. 4B embodiments, may be implemented on respective distinct processing platforms, although numerous other arrangements are possible.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 and systems flow 200, 410 and 411 are possible, in which certain components of the system reside in one data center in a first geographic location while other components of the system reside in one or more other data centers in one or more other geographic locations that are potentially remote from the first geographic location. Thus, it is possible in some implementations of the system 100 and system flows 200, 410 and 411 for the management systems 102/202, control planes 120/420, cluster and hypervisor managers 123/423, OMSs 125/225/425, rendezvous servers 127/227/427, devices 140/240/440 (including legacy devices 141/441, XPUs 142/442), EdgeOS stores 429/449, or portions or components thereof, to reside in different data centers. Numerous other distributed implementations are possible.

Additional examples of processing platforms utilized to implement management systems 102/202, control planes 120/420, cluster and hypervisor managers 123/423, OMSs 125/225/425, rendezvous servers 127/227/427, devices 140/240/440 (including legacy devices 141/441, XPUs 142/442), EdgeOS stores 429/449 and/or other components of the system 100 and system flows 200, 410 and 411 in illustrative embodiments will be described in more detail below in conjunction with FIGS. 6 and 7. It is to be appreciated that these and other features of illustrative embodiments are presented by way of example only, and should not be construed as limiting in any way.

In some embodiments, in addition to the security protocols discussed herein, one or more secure connections may also utilize, for example, one or more of a private Virtual Private Network (VPN), Internet Protocol Security (IPsec), encrypted Virtual Local Area Network (VLAN), secured Secure Shell (SSH), Hypertext Transfer Protocol Secure (HTTPS), Hypertext Transfer Protocol (HTTP) Strict-Transport-Security (HSTS) if it is feasible to do so.

In some embodiments, the provisioning and/or secure connections may conform to various platform security standards, such as National Institute of Standards and Technology (NIST) Special Publication (SP)-800-193 Platform Firmware Resiliency Guidelines, NIST SP-800-227 Zero Trust Architecture, Federal Information Processing Standards Publication (FIPS) 140-3 Security Requirements for Cryptographic Modules, and International Standards Organization (ISO) 28000:2007 Specification for security management systems for the supply chain, etc. The provisioning and/or secure connection processing described herein further enables device integrity assurance functionality, including but not limited to: device tamper detection; boot attestation from Power-On Self-Test (POST) through operating system (OS) hand-over; continuous Chain-of-Trust from POST via TPM; secure boot with end-to-end cryptographic support; OS Machine Owner Key (MOK) cryptographically signed key to device only; OS boot processes which cannot be interrupted or intercepted; hardware configuration change detection and notification; measured boot processing; FIDO compliant secure on-boarding; trusted execution environment (e.g., meeting NIST SP-800-227 Zero Trust Architecture specifications); etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for enabling management of edge computing network deployments with legacy edge devices will now be described in greater detail with reference to FIGS. 6 and 7. Although described in the context of system 100 and system flows 200, 410 and 411, these platforms may also be used to implement at least portions of other information processing systems in other embodiments.

Figure 6:
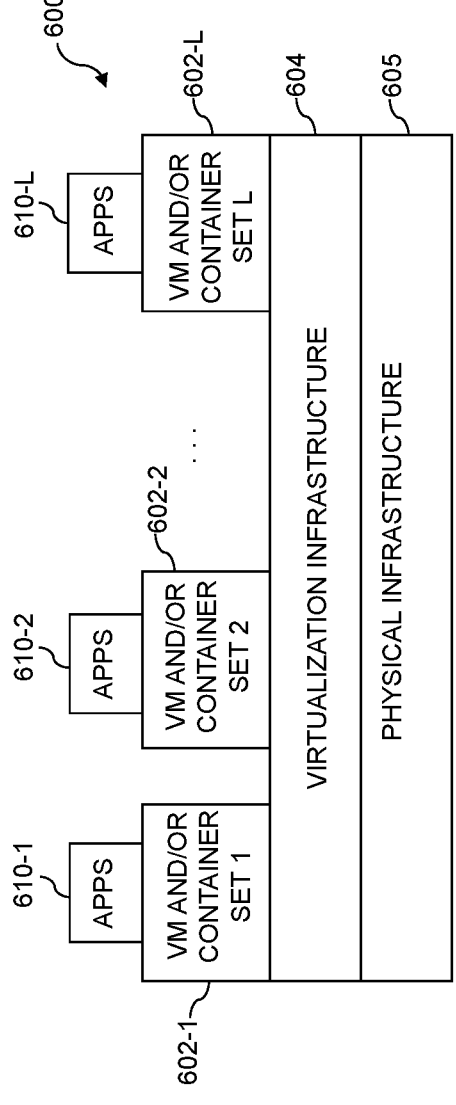
FIGS. 6 and 7 show examples of processing platforms that may be utilized to implement at least a portion of an information processing system in illustrative embodiments.
Figure 7:
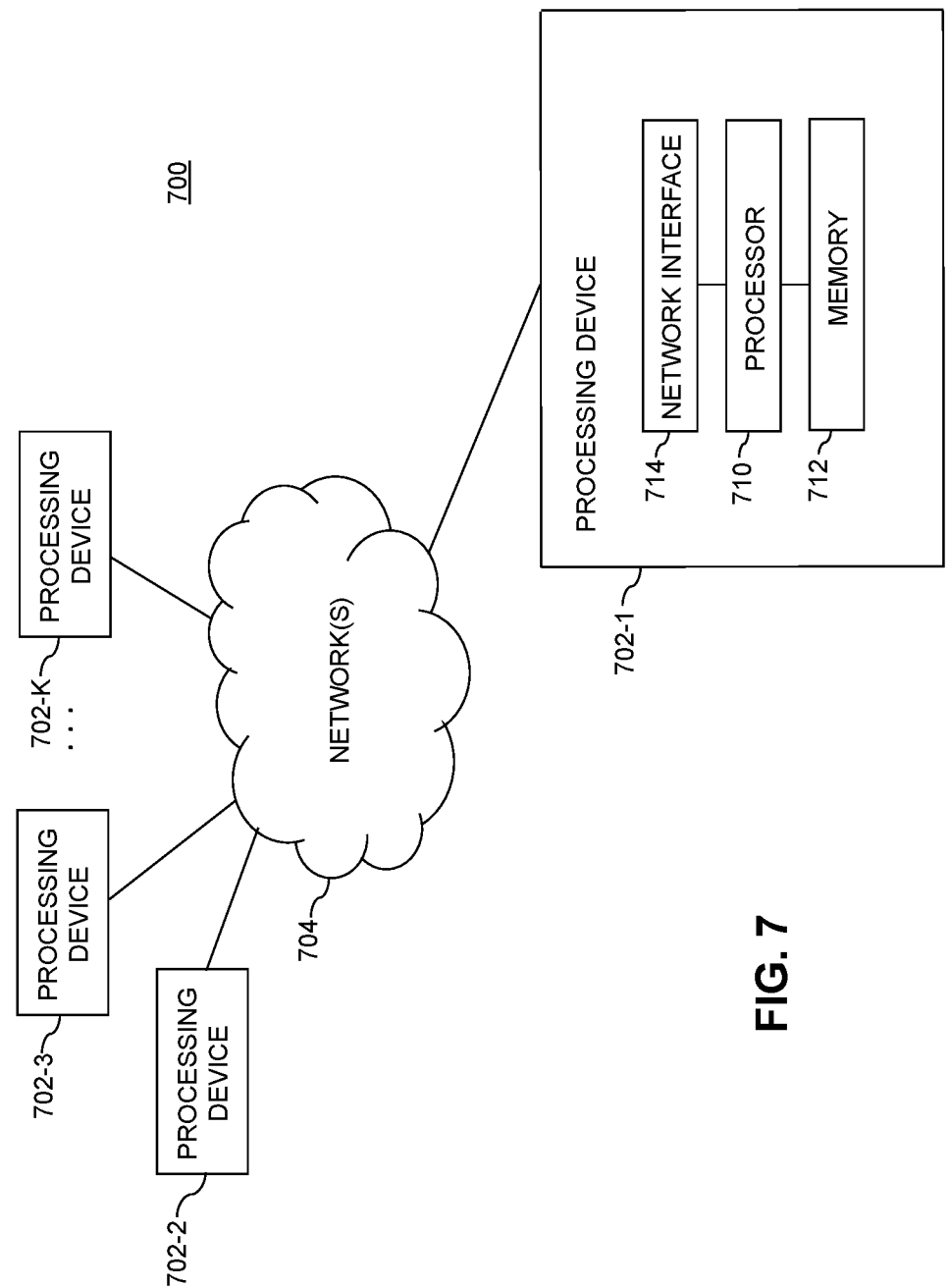

FIG. 6 shows an example processing platform comprising cloud infrastructure 600. The cloud infrastructure 600 comprises a combination of physical and virtual processing resources that may be utilized to implement at least a portion of the information processing system 100 and system flows 200, 410 and 411 in FIGS. 1, 2, 4A and 4B. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 and system flows 200, 410 and 411 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and system flows 200, 410 and 411 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers. The other processing devices 702 of the processing platform 700 are assumed to be configured in a manner similar to that shown for processing device 702-1 in the figure.

Again, the particular processing platform 700 shown in the figure is presented by way of example only, and system 100 and system flows 200, 410 and 411 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure. It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for enabling management of edge computing network deployments with legacy edge devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computing devices, provisioning processes, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processor coupled to a memory, wherein the memory stores program instructions that are executed by the at least one processor to implement a control system of an edge infrastructure management platform, wherein the control system operates to:
verify an identity of an extended processing device that is added as a component of a legacy device;
onboard the extended processing device to the edge infrastructure management platform by performing an onboarding process which comprises providing the extended processing device with management software of the edge infrastructure management platform, in response to verifying the identity of the extended processing device; and
integrate the legacy device into the edge infrastructure management platform through one or more operations performed by the extended processing device using the management software provided by the control system, subsequent to completion of the onboarding process.

2. The apparatus of claim 1 wherein the extended processing device comprises one of a data processing unit, a neural processing unit, a smart network interface card, an infrastructure processing unit, a function accelerator card and a network attached processing unit.

3. The apparatus of claim 1 wherein the management software comprises an operating system of the edge infrastructure management platform.

4. The apparatus of claim 3 wherein, in onboarding the extended processing device, the control system provides the extended processing device with one or more onboarding credentials, and wherein the extended processing device is configured to use the one or more onboarding credentials to perform re-onboarding in response to a failure of the operating system of the edge infrastructure management platform.

5. The apparatus of claim 1 wherein the management software comprises at least one of hypervisor management software and cluster management software to configure a platform of the extended processing device to host one of virtual machines, and containers with applications to allow the extended processing device and the legacy device to collectively operate as a compute endpoint device.

6. The apparatus of claim 1 wherein the control system further operates to:
take one or more snapshots of one or more virtual machines running on an operating system of the legacy device; and
migrate the one or more snapshots to a hypervisor running on the extended processing device.

7. The apparatus of claim 1 wherein the one or more operations comprise booting an operating system of the edge infrastructure management platform onto the legacy device.

8. The apparatus of claim 7 wherein the booting comprises defining at least one of one or more partitions, cryptographic attestations and security corresponding to the operating system of the edge infrastructure management platform.

9. The apparatus of claim 8 wherein the defining is part of a mount and boot workflow.

10. The apparatus of claim 1 wherein the one or more operations comprise processing one or more requests to deploy at least one of one or more virtual machines, one or more containers and one or more applications on the legacy device.

11. The apparatus of claim 10 wherein the control system further operates to deploy a hypervisor on the extended processing device to process the one or more requests.

12. The apparatus of claim 10 wherein the one or more requests are initiated through the edge infrastructure management platform.

13. The apparatus of claim 12 wherein the one or more operations comprise blocking one or more additional requests to deploy at least one of one or more additional virtual machines, one or more additional containers and one or more additional applications on the legacy device, wherein the one or more additional requests are initiated through a source other than the edge infrastructure management platform.

14. The apparatus of claim 1 wherein the one or more operations comprise managing a hypervisor of the legacy device.

15. A computer program product comprising a non-transitory processor-readable storage medium having stored therein program code of one or more software programs, wherein the program code when executed by at least one processing device causes the at least one processing device to implement a control system of an edge infrastructure management platform to perform steps of:
verifying an identity of an extended processing device that is added as a component of a legacy device;

onboarding the extended processing device to the edge infrastructure management platform by performing an onboarding process which comprises providing the extended processing device with management software of the edge infrastructure management platform, in response to verifying the identity of the extended processing device; and integrating the legacy device into the edge infrastructure management platform through one or more operations performed by the extended processing device using the management software provided by the control system, subsequent to completion of the onboarding process.

16. The computer program product of claim 15 wherein the control system further performs steps of:

taking one or more snapshots of one or more virtual machines running on an operating system of the legacy device; and migrating the one or more snapshots to a hypervisor running on the extended processing device.

17. The computer program product of claim 15 wherein the one or more operations comprise processing one or more requests to deploy at least one of one or more virtual machines, one or more containers and one or more applications on the legacy device.

18. A method comprising:

verifying, by a control system of an edge infrastructure management platform, an identity of an extended processing device that is added as a component of a legacy device;

onboarding, by the control system, the extended processing device to the edge infrastructure management platform by performing an onboarding process which comprises providing the extended processing device with management software of the edge infrastructure management platform, in response to verifying the identity of the extended processing device; and integrating the legacy device into the edge infrastructure management platform through one or more operations performed by the extended processing device using the management software provided by the control system, subsequent to completion of the onboarding process.

19. The method of claim 18 further comprising:

taking, by the control system, one or more snapshots of one or more virtual machines running on an operating system of the legacy device; and migrating, by the control system, the one or more snapshots to a hypervisor running on the extended processing device.

20. The method of claim 18 wherein the one or more operations comprise processing one or more requests to deploy at least one of one or more virtual machines, one or more containers and one or more applications on the legacy device.

* * * * *